(12) United States Patent
Yoo

(10) Patent No.: US 12,466,469 B2
(45) Date of Patent: Nov. 11, 2025

(54) STEERING CONTROL APPARATUS AND METHOD

(71) Applicant: HL Mando Corporation, Pyeongtaek-si (KR)

(72) Inventor: Manjae Yoo, Pyeongtaek-si (KR)

(73) Assignee: HL MANDO CORPORATION, Pyeongtaek-si (KR)

(*) Notice: Subject to any disclaimer, the term of this patent is extended or adjusted under 35 U.S.C. 154(b) by 40 days.

(21) Appl. No.: 18/649,234

(22) Filed: Apr. 29, 2024

(65) Prior Publication Data
US 2025/0162645 A1 May 22, 2025

(30) Foreign Application Priority Data
Nov. 20, 2023 (KR) .................. 10-2023-0160723

(51) Int. Cl.
B62D 5/04 (2006.01)
B62D 6/10 (2006.01)

(52) U.S. Cl.
CPC ............ B62D 5/046 (2013.01); B62D 5/049 (2013.01)

(58) Field of Classification Search
CPC ...... B62D 5/049; B62D 5/046; B62D 5/0484; B62D 6/10; B62D 6/001
USPC ..................................... 701/41–44
See application file for complete search history.

(56) References Cited

U.S. PATENT DOCUMENTS

| 9,828,023 | B2 | 11/2017 | Mose et al. | |
|---|---|---|---|---|
| 2015/0329140 | A1* | 11/2015 | Tamaizumi | B62D 6/003 701/42 |
| 2015/0367881 | A1* | 12/2015 | Tsunoda | G01L 5/221 701/43 |
| 2016/0304119 | A1* | 10/2016 | Sugawara | H02P 21/05 |
| 2018/0043928 | A1* | 2/2018 | Fujita | H02P 29/028 |
| 2020/0361518 | A1 | 11/2020 | Yamamoto et al. | |
| 2020/0377145 | A1* | 12/2020 | Suehiro | B21K 1/063 |
| 2020/0403543 | A1* | 12/2020 | Imamura | B62D 5/0484 |
| 2022/0041215 | A1* | 2/2022 | Suzuki | B62D 15/021 |
| 2023/0016560 | A1* | 1/2023 | Kitazume | B62D 5/0472 |
| 2023/0085431 | A1* | 3/2023 | Ahn | F16H 57/039 180/444 |
| 2023/0365190 | A1* | 11/2023 | Tóth | G01L 5/221 |

FOREIGN PATENT DOCUMENTS

JP 2020-131860 A 8/2020

* cited by examiner

Primary Examiner — Hai H Huynh
Assistant Examiner — Johnny H Hoang
(74) Attorney, Agent, or Firm — Hauptman Ham, LLP

(57) ABSTRACT

Embodiments of the present disclosure relate to a steering control apparatus and method. It is possible to provide a steering control apparatus and method in which, even if a failure or a malfunction occurs in a torque detection sensor unit, a controller generates a control signal by calculating a torque estimation value based on a vehicle speed, a steering angle, a yaw rate value and a lateral acceleration value and controls a dual winding steering motor unit using the control signal, thereby enabling normal steering control for a predetermined time.

20 Claims, 5 Drawing Sheets

STEERING CONTROL APPARATUS AND METHOD

CROSS-REFERENCE TO RELATED APPLICATION

This application claims priority from Korean Patent Application No. 10-2023-0160723, filed on Nov. 20, 2023, which is hereby incorporated by reference for all purposes as if fully set forth herein.

BACKGROUND

Field

Embodiments of the present disclosure relate to a steering control apparatus and method which enables normal steering control even when a failure or a malfunction occurs in a torque detection sensor unit.

Description of Related Art

Recently, research on a redundancy system as a technology related with autonomous driving is being actively conducted.

A steering control apparatus to which such a redundancy system is applied generally includes a plurality of sensors, a plurality of ECUs and a plurality of steering motors.

In such a steering control apparatus, if one ECU among the plurality of ECUs does not receive detection information from a sensor, the other ECU continues to control a steering motor. However, if the other ECU does not receive detection information from the sensor, a situation that could threaten a driver's life is likely to occur.

In particular, if a failure or a malfunction occurs in a torque sensor, steering force may suddenly change to put the driver in a dangerous situation.

BRIEF SUMMARY

Embodiments of the present disclosure are directed to a steering control apparatus and method in which, even if a failure or a malfunction occurs in a torque detection sensor unit, a controller generates a control signal by calculating a torque estimation value based on a vehicle speed, a steering angle, a yaw rate value and a lateral acceleration (lateral G) value and controls a dual winding steering motor unit using the control signal, thereby enabling normal steering control for a predetermined time.

In an aspect, an embodiment of the present disclosure may provide a steering control apparatus including: a torque detection sensor unit including a first torque sensor and a second torque sensor which detect relative rotational displacements of a steering input shaft and a steering output shaft according to twist of a torsion bar disposed between the steering input shaft and the steering output shaft; a controller including a first control module which is connected to the first torque sensor and a second control module which is connected to the second torque sensor; and a dual winding steering motor unit including a first winding motor which is connected to the first control module and a second winding motor which is connected to the second control module, wherein at least one of the first control module and the second control module detects a failed state by checking a detection signal of each of the first torque sensor and the second torque sensor, calculates a torque estimation value using information of a vehicle speed sensor, a steering angle sensor, a yaw rate sensor and a lateral acceleration sensor depending on states of the torque detection sensor unit and an external communication channel, and controls the dual winding steering motor unit by generating a control signal based on the torque estimation value.

At least one of the first control module and the second control module may include: a detector detecting a failed state of each of the first torque sensor and the second torque sensor by checking a detection signal of each of the first torque sensor and the second torque sensor; a calculator selecting an external communication channel of a normal state according to a failed state detection result of the detector, and calculating a torque estimation value using information of the vehicle speed sensor, the steering angle sensor, the yaw rate sensor and the lateral acceleration sensor; and an outputter generating a control signal based on the torque estimation value of the calculator, and outputting the control signal to the dual winding steering motor unit.

The controller may control the dual winding steering motor unit with a current amount smaller than a current amount in a normal state.

The smaller current amount may be 40% to 60% of the current amount in the normal state.

The external communication channel may include a first external communication channel and a second external communication channel which are connected to external nodes and a gateway for transmitting and receiving data of the first external communication channel and the second external communication channel.

The first control module and the second control module may exchange information through an internal communication channel, the first control module may exchange information with the vehicle speed sensor, the steering angle sensor, the yaw rate sensor and the lateral acceleration sensor through the first external communication channel, and the second control module may exchange information with the vehicle speed sensor, the steering angle sensor, the yaw rate sensor and the lateral acceleration sensor through the second external communication channel.

The first control module or the second control module may determine whether the internal communication channel has failed, and if the internal communication channel has failed, may exchange information through the external communication channel.

In the case where control priority of the first control module is higher than control priority of the second control module, if the first control module detects a failure of the first torque sensor, the first control module may transfer control right for the dual winding steering motor unit to the second control module, and the second control module may control the dual winding steering motor unit when the control right is transferred.

In the case where control priority of the second control module is lower than control priority of the first control module, if the second control module detects failures of the first torque sensor and the second torque sensor, the second control module may transfer control right for the dual winding steering motor unit to the first control module, and the first control module may calculate a torque estimation value by receiving information of the vehicle speed sensor, the steering angle sensor, the yaw rate sensor and the lateral acceleration sensor through the first external communication channel when the control right is transferred and may control the dual winding steering motor unit by generating a control signal based on the torque estimation value.

If the first control module detects failures of the first torque sensor, the second torque sensor and the first external communication channel, the first control module may transfer control right for the dual winding steering motor unit to the second control module, and the second control module may calculate a torque estimation value by receiving information of the vehicle speed sensor, the steering angle sensor, the yaw rate sensor and the lateral acceleration sensor through the second external communication channel when the control right is transferred and may control the dual winding steering motor unit by generating a control signal based on the torque estimation value.

In the case where control priority of the first control module is higher than control priority of the second control module, if the first control module determines, according to a result of comparing a torque value of the first torque sensor and a torque value of the second torque sensor through internal communication, that the torque value of the first torque sensor and the torque value of the second torque sensor are different from each other, the first control module may calculate a torque estimation value by receiving information of the vehicle speed sensor, the steering angle sensor, the yaw rate sensor and the lateral acceleration sensor through the first external communication channel and may control the dual winding steering motor unit by generating a control signal based on the torque estimation value.

In the case where control priority of the second control module is lower than control priority of the first control module, if the first control module determines, according to a result of comparing a torque value of the first torque sensor and a torque value of the second torque sensor through internal communication, that the torque value of the first torque sensor and the torque value of the second torque sensor are different from each other and detects a failure of the first external communication channel, the first control module may transfer control right for the dual winding steering motor unit to the second control module, and the second control module may calculate a torque estimation value by receiving information of the vehicle speed sensor, the steering angle sensor, the yaw rate sensor and the lateral acceleration sensor through the second external communication channel and may control the dual winding steering motor unit by generating a control signal based on the torque estimation value.

In another aspect, an embodiment of the present disclosure may provide a steering control method including: state detection step in which a first control module or a second control module detects failed states of a torque detection sensor unit and a communication channel; torque estimation value calculation step in which, depending on a state detection result, the first control module or the second control module calculates a torque estimation value using information of a vehicle speed sensor, a steering angle sensor, a yaw rate sensor and a lateral acceleration sensor through an external communication channel; and control signal output step in which the first control module or the second control module generates a control signal based on the torque estimation value and outputs the control signal to a dual winding steering motor unit.

In the torque estimation value calculation step, if a failure of the torque detection sensor unit is detected depending on a state detection result, the first control module may calculate a torque estimation value using information of the vehicle speed sensor, the steering angle sensor, the yaw rate sensor and the lateral acceleration sensor through a first external communication channel, and in the control signal output step, the first control module may generate a control signal based on the torque estimation value and may output the control signal to the dual winding steering motor unit.

In the torque estimation value calculation step, if failures of the torque detection sensor unit and the first external communication channel are detected depending on a state detection result, the second control module may calculate a torque estimation value using information of the vehicle speed sensor, the steering angle sensor, the yaw rate sensor and the lateral acceleration sensor through a second external communication channel, and in the control signal output step, the second control module may generate a control signal based on the torque estimation value and may output the control signal to the dual winding steering motor unit.

In the torque estimation value calculation step, if failures of the torque detection sensor unit and the first external communication channel are detected depending on a state detection result, the first control module may transfer control right for the dual winding steering motor unit to the second control module.

The first control module and the second control module may exchange information through an internal communication channel, may determine whether the internal communication channel has failed, and if the internal communication channel has failed, may exchange information through the external communication channel.

In the control signal output step, the first control module may output a current amount smaller than a current amount in a normal state to the dual winding steering motor unit as a control signal.

In the control signal output step, the second control module may output a current amount smaller than a current amount in a normal state to the dual winding steering motor unit as a control signal.

The smaller current amount may be 40% to 60% of the current amount in the normal state.

According to the embodiments of the present disclosure, it is possible to provide a steering control apparatus and method in which, even if a failure or a malfunction occurs in a torque detection sensor unit, a controller generates a control signal by calculating a torque estimation value based on a vehicle speed, a steering angle, a yaw rate value and a lateral acceleration (lateral G) value and controls a dual winding steering motor unit using the control signal, thereby enabling normal steering control for a predetermined time.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
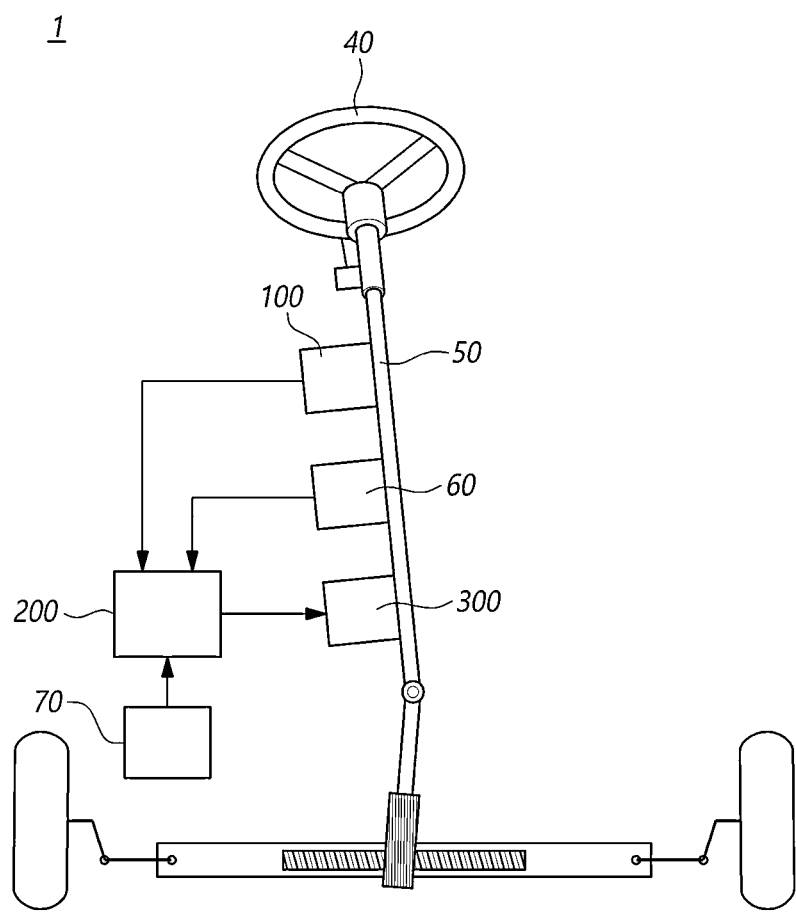
FIG. 1 is a diagram schematically illustrating a C-MDPS system according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including," "having," "containing," "constituting," "make up of" and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)" or "(B)" may be used herein to describe elements of the present disclosure. Each of these terms is not used to define essence, order, sequence, number of elements, etc., but is used merely to distinguish the corresponding element from other elements.

When it is mentioned that a first element "is connected or coupled to," "contacts or overlaps," etc. a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc. each other via a fourth element. Here, the second element may be included in at least one of two or more elements that "are connected or coupled to," "contact or overlap," etc. each other.

When time relative terms, such as "after," "subsequent to," "next," "before" and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc. are mentioned, it should be considered that numerical values for elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

Figure 2:
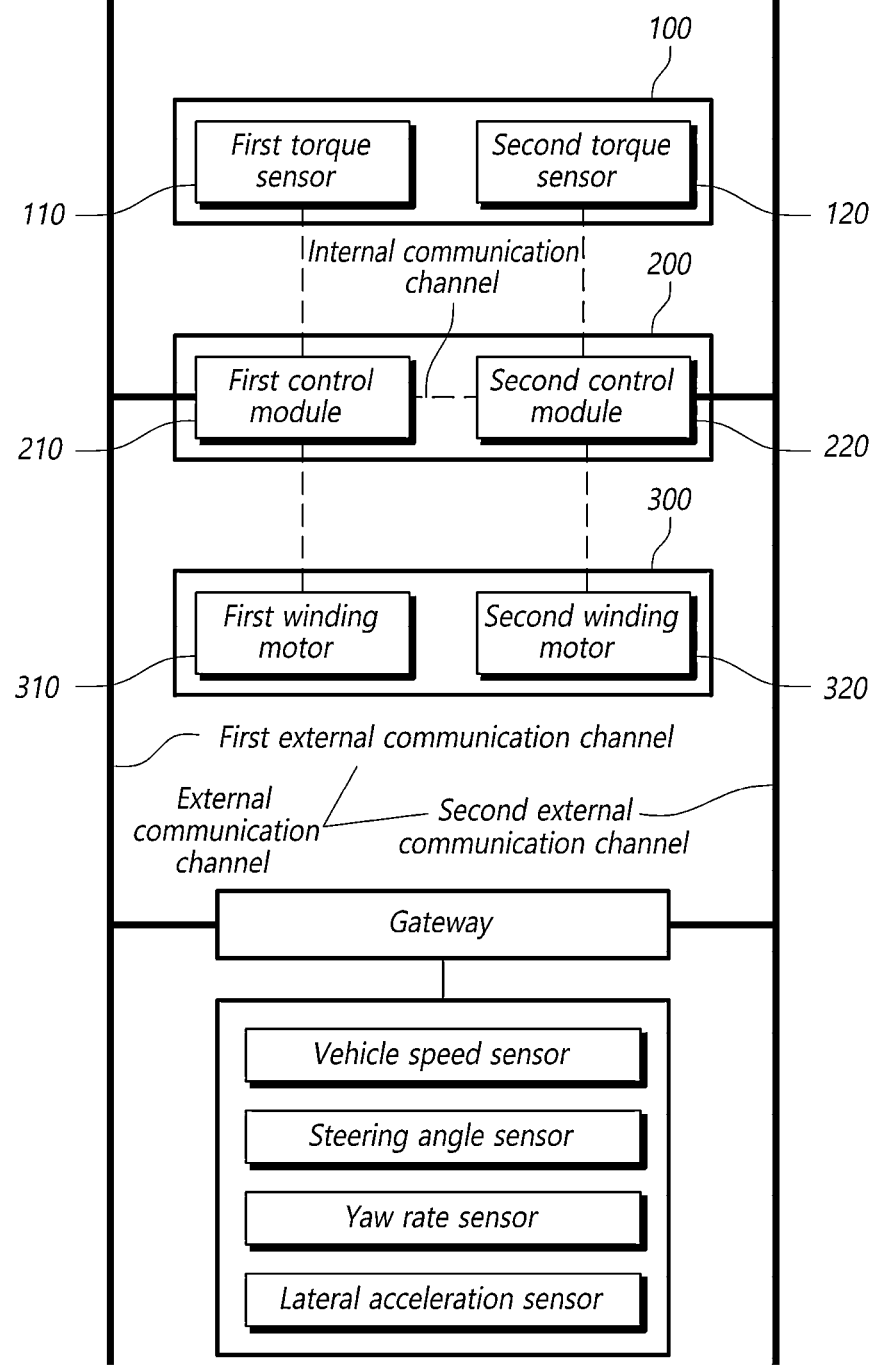
FIG. 2 is a configuration diagram showing a steering control apparatus according to the embodiment of the present disclosure.
Figure 3:
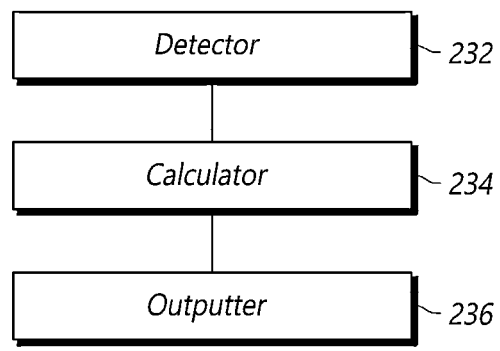
FIG. 3 is a block diagram showing a controller of the steering control apparatus according to the embodiment of the present disclosure.
Figure 4:
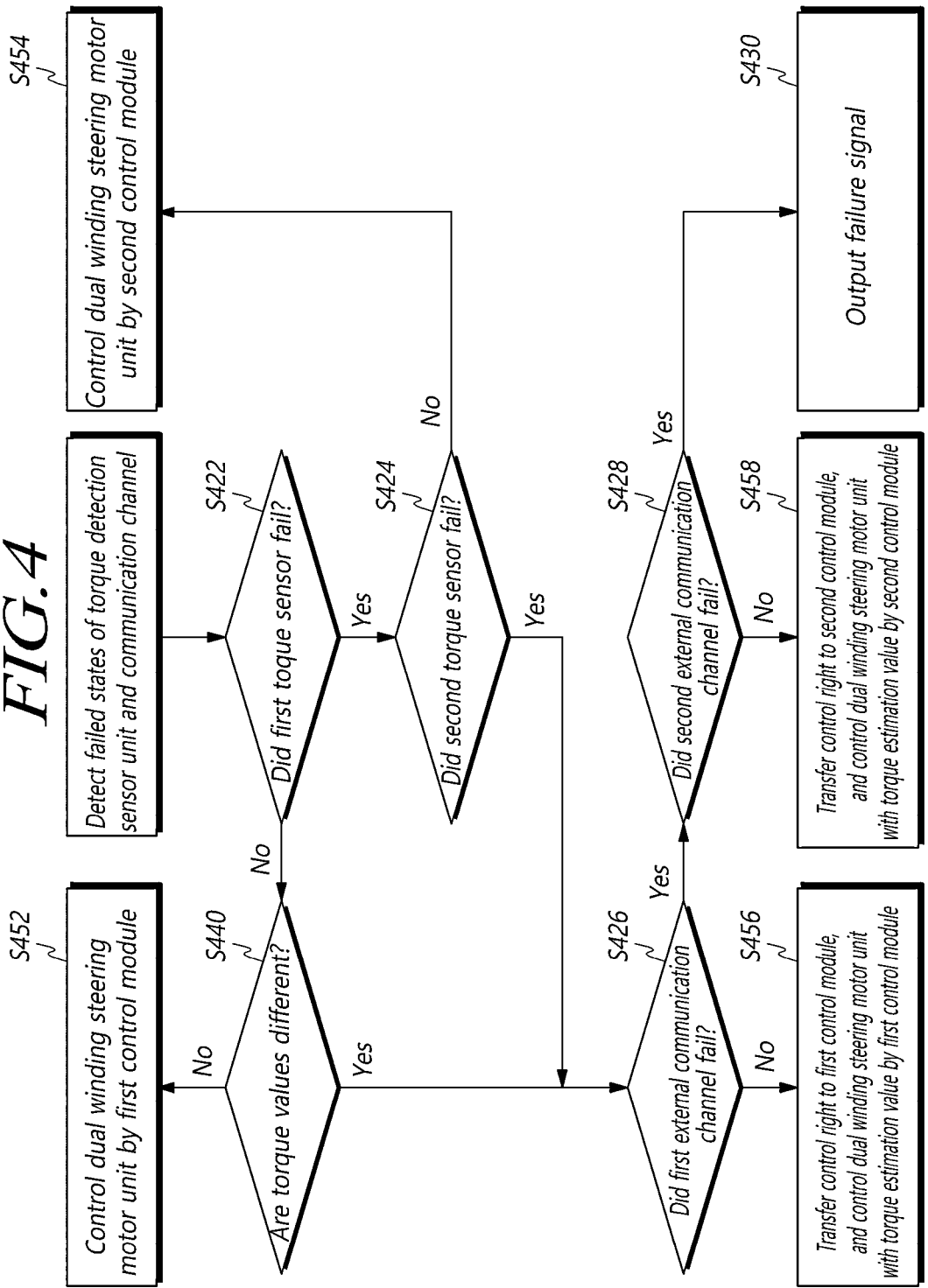
FIG. 4 is a flowchart showing a steering control method according to an embodiment of the present disclosure.
Figure 5:
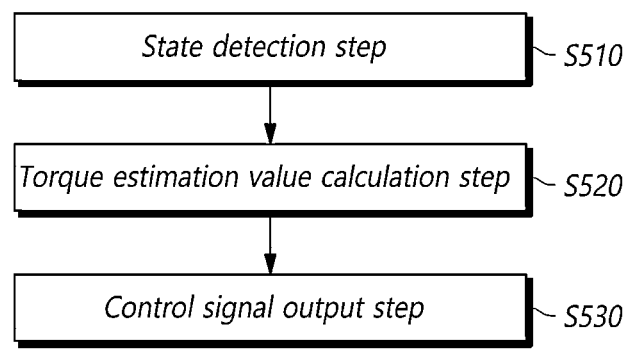
FIG. 5 is a flowchart showing a steering control method according to an embodiment of the present disclosure.

FIG. 1 is a diagram schematically illustrating an EPS system according to an embodiment of the present disclosure, FIG. 2 is a configuration diagram showing a steering control apparatus according to the embodiment of the present disclosure, FIG. 3 is a block diagram showing a controller of the steering control apparatus according to the embodiment of the present disclosure, FIG. 4 is a flowchart showing a steering control method according to an embodiment of the present disclosure, and FIG. 5 is a flowchart showing a steering control method according to an embodiment of the present disclosure.

In order to provide convenience in driving, steering control apparatuses for a vehicle include an electric power steering (EPS) apparatus which assists the manipulation force of a steering wheel using an electric motor such as a motor, and a steer-by-wire (SBW) steering apparatus which enables steering of a vehicle using an electric motor such as a motor.

Embodiments of the present disclosure may be applied to the electric motors of a C-MDPS system as a column-type (C-type) motor-driven power steering apparatus in which a steering motor rotates the steering shaft of a steering column, an R-MDPS system as a rack-type (R-type) motor-driven power steering apparatus in which a steering motor directly rotates a rack bar, and a steer-by-wire (SBW) system in which power is transferred by transmitting and receiving electrical signals through a wire, a cable, etc. instead of using a mechanical power transfer device.

Hereinafter, the embodiments of the present disclosure will be described by taking the structure of the C-MDPS system as an example. However, the embodiments of the present disclosure are not limited thereto, and may be applied to all types of steering control apparatuses.

FIG. 1 is a diagram schematically illustrating a C-MDPS system according to an embodiment of the present disclosure.

Referring to FIG. 1, the C-MDPS system 1 according to the embodiment of the present disclosure may include a steering wheel 40, a steering column 50, a steering angle detection sensor unit 60, a vehicle speed detection sensor unit 70, a torque detection sensor unit 100, a controller 200, and a dual winding steering motor unit 300.

The steering wheel 40 may be rotated by a driver's manipulation, may be coupled to the steering input shaft of a steering shaft, and may be connected to a rack bar through a pinion gear and a rack gear which are connected to the steering output shaft of the steering shaft.

The steering shaft of the steering column 50 may rotate together with the steering wheel 40, and may include the steering input shaft which is coupled to the steering wheel 40 and the steering output shaft which is connected to the steering input shaft by the medium of a torsion bar.

Although not illustrated, the steering shaft of the steering column 50 may be linked with a plurality of reducers, and any one of the plurality of reducers may be coupled to the steering column 50.

The steering angle detection sensor unit 60 may include a steering angle sensor, and when detecting a steering angle generated by the rotation of the steering wheel 40, may output information on steering angle and steering angular speed.

A steering angle may not be detected if the steering wheel 40 does not rotate, and information on steering angle may not be outputted accordingly.

The vehicle speed detection sensor unit 70 may include a vehicle speed sensor, and may detect the speed of a vehicle and output information on vehicle speed.

The torque detection sensor unit 100 may include a first torque sensor 110 and a second torque sensor 120 which detect relative rotational displacements of the steering input shaft and the steering output shaft according to the twist of the torsion bar disposed between the steering input shaft and the steering output shaft, and when detecting a steering torque generated by the rotation of the steering wheel 40, may output information on steering torque.

A steering torque may mean a torque that is applied to the torsion bar existing between the steering input shaft and the steering output shaft of the steering shaft.

A steering torque may be detected even if the steering wheel 40 does not rotate.

The controller 200 may include a first control module 210 which is connected to the first torque sensor 110 and a second control module 220 which is connected to the second torque sensor 120.

The controller 200 may be implemented with hardware such as an electronic control unit (ECU) including a micro controller unit (MCU), an inverter, a printed circuit board (PCB), etc. and software.

The dual winding steering motor unit 300 may receive a target current from the controller 200, and may be driven with a torque and a rotational speed according to the target current.

The dual winding steering motor unit 300 may include a first winding motor 310 which is connected to the first control module 210, and a second winding motor 320 which is connected to the second control module 220.

Although not illustrated, the dual winding steering motor unit 300 may transfer rotational force to the steering shaft through a reducer which is disposed on the steering column 50.

In the C-MDPS system 1, in order to assist the manipulation force of the steering wheel 40 so as to allow the vehicle's direction to be easily changed with less force, the controller 200 may calculate a target rack position for providing a steering assistant force based on the steering information of the torque detection sensor unit 100, the steering angle detection sensor unit 60 and the vehicle speed detection sensor unit 70, and may output a target current corresponding to the target rack position to the dual winding steering motor unit 300.

In the C-MDPS system 1, as the steering shaft of the steering column 50 rotates due to rotation of the dual winding steering motor unit 300, the rack bar may move left and right through the pinion gear and rack gear which are connected to the output end of the steering shaft.

Accordingly, in the C-MDPS system 1, as wheels which are connected to both ends of the rack bar are moved to the left or right due to rotation of the dual winding steering motor unit 300 which assists the manipulation force of the steering wheel 40, the vehicle may be smoothly moved in a desired direction.

The steering information may include a steering torque signal which is outputted from the torque detection sensor unit 100, a steering angle signal which is outputted from the steering angle detection sensor unit 60 and a vehicle speed signal which is outputted from the vehicle speed detection sensor unit 70.

The steering information may be received by not being limited to external nodes, and may be received through a gateway.

FIG. 2 is a configuration diagram showing a steering control apparatus according to the embodiment of the present disclosure.

Referring to FIG. 2, the first control module 210 may be supplied with power from a power source (not shown), and may perform a function of generating, using the inverter, a target current to be supplied to each winding of the first winding motor 310 and supplying the target current.

The second control module 220 may be supplied with power from the power source (not shown), and may perform a function of generating, using the inverter, a target current to be supplied to each winding of the second winding motor 320 and supplying the target current.

If the control priority of the first control module 210 is higher than the control priority of the second control module 220, the first control module 210 may perform a function of generating and supplying a target current to be supplied to each winding of the first winding motor 310, and the second control module 220 may not perform a control function.

In the case where the control priority of the second control module 220 is lower than the control priority of the first control module 210, if the failure of the first torque sensor 110 is detected, the first control module 210 may transfer control right to the second control module 220, the second control module 220 may perform a function of generating and supplying a target current to be supplied to each winding of the second winding motor 320, and the first control module 210 may not perform a control function.

At least one of the first control module 210 and the second control module 220 may detect a failed state by checking the detection signal of each of the first torque sensor 110 and the second torque sensor 120, may calculate a torque estimation value using the information of a vehicle speed sensor, a steering angle sensor, a yaw rate sensor and a lateral acceleration sensor depending on the states of the torque detection sensor unit 100 and an external communication channel, and may control the dual winding steering motor unit 300 by generating a control signal based on the torque estimation value.

In more detail, in the case where the control priority of the first control module 210 is higher than the control priority of the second control module 220, if the failures of the first torque sensor 110 and the second torque sensor 120 are detected, the first control module 210 may calculate a torque estimation value using the information of the vehicle speed sensor, the steering angle sensor, the yaw rate sensor and the lateral acceleration sensor, and may control the dual winding steering motor unit 300 by generating a control signal based on the torque estimation value.

In the case where the control priority of the second control module 220 is lower than the control priority of the first control module 210, if the failures of the first torque sensor 110, the second torque sensor 120 and a first external communication channel are detected, the second control module 220 may calculate a torque estimation value using the information of the vehicle speed sensor, the steering angle sensor, the yaw rate sensor and the lateral acceleration sensor, and may control the dual winding steering motor unit 300 by generating a control signal based on the torque estimation value.

For example, a torque estimation value may be calculated using the information of the vehicle speed sensor, the steering angle sensor, the yaw rate sensor and the lateral acceleration sensor. For example, a torque estimation value may be calculated as the information of the vehicle speed sensor, the steering angle sensor, the yaw rate sensor and the lateral acceleration sensor is inputted to a preset torque estimation logic.

More specifically, if the first torque sensor 110 and the second torque sensor 120 fail, at least one of the first control module 210 and the second control module 220 may calculate and estimate a rack force value by substituting a yaw rate value and a lateral acceleration value of the vehicle collected in real time in the vehicle into the model equation of a preset rack force estimation model. In addition, at least one of the first control module 210 and the second control module 220 may calculate an estimation value of steering torque according to the driver's steering wheel manipulation, from a rack force value estimated using a predetermined gain value. Specifically, at least one of the first control module 210 and the second control module 220 may calculate a friction compensation torque from information on steering angular speed or motor angular speed obtained through a sensor, and may calculate a steering torque estimation value corresponding to a rack force value by multiplying the estimated rack force value by a gain value.

Besides, at least one of the first control module 210 and the second control module 220 may calculate a torque estimation value in various ways. In other words, in addition to the torque estimation value calculation described above, various known torque estimation values may be used.

Accordingly, in the present embodiment, if it is detected that the torque detection sensor unit 100 has failed, by controlling the dual winding steering motor unit 300 by generating a control signal based on a torque estimation value, it is possible to perform normal steering control for a predetermined time.

FIG. 3 is a block diagram showing a controller of the steering control apparatus according to the embodiment of the present disclosure.

Referring to FIG. 3, at least one of the first control module 210 and the second control module 220 may include a detector 232 which detects a failed state of each of the first torque sensor 110 and the second torque sensor 120 by checking the detection signal of each of the first torque sensor 110 and the second torque sensor 120; a calculator 234 which selects an external communication channel of a normal state according to the failed state detection result of the detector 232 and calculates a torque estimation value using the information of the vehicle speed sensor, the steering angle sensor, the yaw rate sensor and the lateral acceleration sensor; and an outputter 236 which generates a control signal based on the torque estimation value of the calculator 234 and outputs the control signal to the dual winding steering motor unit 300.

Each of the first control module 210 and the second control module 220 may include the detector 232, the calculator 234 and the outputter 236.

The detector 232 may detect a failed state by checking the detection signal of each of the torque detection sensor unit 100 including the first torque sensor 110 and the second torque sensor 120, the external communication channel including the first external communication channel and a second external communication channel, and an internal communication channel.

The calculator 234 may calculate a torque estimation value using the information of the vehicle speed sensor, the steering angle sensor, the yaw rate sensor and the lateral acceleration sensor according to the failed state detection result of the detector 232.

If the failure of the torque detection sensor unit 100 is detected, the calculator 234 may calculate a torque estimation value by receiving the information of the vehicle speed sensor, the steering angle sensor, the yaw rate sensor and the lateral acceleration sensor through the first external communication channel.

If the failures of the torque detection sensor unit 100 and the first external communication channel are detected, the calculator 234 may calculate a torque estimation value by receiving the information of the vehicle speed sensor, the steering angle sensor, the yaw rate sensor and the lateral acceleration sensor through the second external communication channel.

The outputter 236 may generate a control signal based on the torque estimation value of the calculator 234, and may output the control signal to the dual winding steering motor unit 300.

At this time, the controller 200 may control the dual winding steering motor unit 300 with a current amount smaller than a current amount in a normal state.

That is to say, as a control signal is generated based on a torque estimation value, the precision of the torque estimation value is not higher than the measurement value of the torque detection sensor unit 100. Therefore, in this consideration, the controller 200 may output the control signal to the dual winding steering motor unit 300 so that the dual winding steering motor unit 300 is controlled with a current amount smaller than the current amount in the normal state.

The smaller current amount may be controlled to a current amount corresponding to 40% to 60% of the current amount in the normal state.

For example, if the failures of the first torque sensor 110 and the second torque sensor 120 are detected, the first control module 210 may control the first winding motor 310 with a current amount of 50% smaller than the current amount in the normal state, based on a torque estimation value.

If the failures of the first torque sensor 110, the second torque sensor 120 and the first external communication channel are detected, the second control module 220 may control the second winding motor 320 with a current amount of 50% smaller than the current amount in the normal state, based on a torque estimation value.

The external communication channel may include the first external communication channel and the second external communication channel which are connected to external nodes, and may include a gateway for transmitting and receiving data of the first external communication channel and the second external communication channel.

The external nodes may be packet switches or network access points which are connected to modules outside the EPS for communication.

The first control module 210 and the second control module 220 may receive steering information detected from a plurality of sensors through the gateway as well as the external nodes.

For example, the external communication channel may be a public (vehicle) communication line, and the internal communication channel may be a private communication line through which only the first control module 210 and the second control module 220 may transmit and receive data.

The first control module 210 and the second control module 220 may exchange information through the internal communication channel.

The first control module 210 may exchange information with the vehicle speed sensor, the steering angle sensor, the yaw rate sensor and the lateral acceleration sensor through the first external communication channel, and the second control module 220 may exchange information with the vehicle speed sensor, the steering angle sensor, the yaw rate sensor and the lateral acceleration sensor through the second external communication channel.

The first control module 210 or the second control module 220 may determine whether the internal communication channel has failed, and if the internal communication channel has failed, may exchange information through the external communication channel.

FIG. 4 is a flowchart showing a steering control method according to an embodiment of the present disclosure.

Referring to FIG. 4, in the case where the control priority of the first control module 210 is higher than the control priority of the second control module 220, if the first control module 210 detects the failure of the first torque sensor 110, the first control module 210 may transfer control right for the dual winding steering motor unit 300 to the second control module 220, and the second control module 220 may control the dual winding steering motor unit 300 when the control right is transferred (S422, S424 and S454).

In the case where the control priority of the second control module 220 is lower than the control priority of the first control module 210, if the second control module 220 detects the failures of the first torque sensor 110 and the second torque sensor 120, the second control module 220 may transfer control right for the dual winding steering motor unit 300 to the first control module 210, and the first control module 210 may calculate a torque estimation value by receiving the information of the vehicle speed sensor, the steering angle sensor, the yaw rate sensor and the lateral acceleration sensor through the first external communication channel when the control right is transferred and may control the dual winding steering motor unit 300 by generating a control signal based on the torque estimation value (S422, S424, S426 and S456).

If the first control module 210 detects the failures of the first torque sensor 110, the second torque sensor 120 and the first external communication channel, the first control module 210 may transfer control right for the dual winding steering motor unit 300 to the second control module 220, and the second control module 220 may calculate a torque estimation value by receiving the information of the vehicle speed sensor, the steering angle sensor, the yaw rate sensor and the lateral acceleration sensor through the second external communication channel when the control right is transferred and may control the dual winding steering motor unit 300 by generating a control signal based on the torque estimation value (S422, S424, S426, S428 and S458).

In the case where the control priority of the first control module 210 is higher than the control priority of the second control module 220, if the first control module 210 determines, according to a result of comparing a torque value of the first torque sensor 110 and a torque value of the second torque sensor 120 through internal communication, that the torque value of the first torque sensor 110 and the torque value of the second torque sensor 120 are different from each other, the first control module 210 may calculate a torque estimation value by receiving the information of the vehicle speed sensor, the steering angle sensor, the yaw rate sensor and the lateral acceleration sensor through the first external communication channel and may control the dual winding steering motor unit 300 by generating a control signal based on the torque estimation value (S422, S440, S426 and S456).

If it is determined that a torque value of the first torque sensor 110 and a torque value of the second torque sensor 120 are the same or the difference therebetween is included in a normal reference range, the first control module 210 may control the dual winding steering motor unit 300 by receiving the steering torque signal of the first torque sensor 110 (S422, S440 and S452).

In the case where the control priority of the second control module 220 is lower than the control priority of the first control module 210, if the first control module 210 determines, according to a result of comparing a torque value of the first torque sensor 110 and a torque value of the second torque sensor 120 through internal communication, that the torque value of the first torque sensor 110 and the torque value of the second torque sensor 120 are different from each other and detects the failure of the first external communication channel, the first control module 210 may transfer control right for the dual winding steering motor unit 300 to the second control module 220, and the second control module 220 may calculate a torque estimation value by receiving the information of the vehicle speed sensor, the steering angle sensor, the yaw rate sensor and the lateral acceleration sensor through the second external communication channel and may control the dual winding steering motor unit 300 by generating a control signal based on the torque estimation value (S422, S440, S426, S428 and S458).

If the failures of the torque detection sensor unit 100 and the external communication channel are detected, the controller 200 may output a failure signal (S422, S424, S426, S428 and S430).

The controller 200 may output the failure signal for the torque detection sensor unit 100 and the external communication channel, through an information output unit including a liquid crystal display (LCD), a head-up display (HUD), or the like.

The information output unit may also include a sound output module such as a speaker capable of outputting audio data.

In another aspect, an embodiment of the present disclosure may provide a steering control method including state detection step S510 in which the first control module 210 or the second control module 220 detects the failed states of the torque detection sensor unit 100 and the communication channel; torque estimation value calculation step S520 in which, depending on a state detection result, the first control module 210 or the second control module 220 calculates a torque estimation value using the information of the vehicle speed sensor, the steering angle sensor, the yaw rate sensor and the lateral acceleration sensor through the external communication channel; and control signal output step S530 in which the first control module 210 or the second control module 220 generates a control signal based on the torque estimation value and outputs the control signal to the dual winding steering motor unit 300.

In the state detection step S510, the first control module 210 or the second control module 220 may detect the failed states of the first torque sensor 110, the second torque sensor 120, the first external communication channel, the second external communication channel and the internal communication channel.

In the torque estimation value calculation step S520, depending on a state detection result, the first control module 210 or the second control module 220 may calculate a torque estimation value using the information of the vehicle speed sensor, the steering angle sensor, the yaw rate sensor and the lateral acceleration sensor through the external communication channel.

In the control signal output step S530, the first control module 210 or the second control module 220 may generates a control signal based on the torque estimation value and may output the control signal to the dual winding steering motor unit 300.

In the torque estimation value calculation step S520, if the failure of the torque detection sensor unit 100 is detected depending on a state detection result, the first control module 210 may calculate a torque estimation value using the information of the vehicle speed sensor, the steering angle sensor, the yaw rate sensor and the lateral acceleration sensor through the first external communication channel, and in the control signal output step S530, the first control module 210 may generate a control signal based on the torque estimation value and may output the control signal to the dual winding steering motor unit 300.

In addition, in the torque estimation value calculation step S520, if the failures of the torque detection sensor unit 100 and the first external communication channel are detected depending on a state detection result, the second control module 220 may calculate a torque estimation value using the information of the vehicle speed sensor, the steering angle sensor, the yaw rate sensor and the lateral acceleration sensor through the second external communication channel, and in the control signal output step S530, the second control module 220 may generate a control signal based on the torque estimation value and may output the control signal to the dual winding steering motor unit 300.

In the torque estimation value calculation step S520, if the failures of the torque detection sensor unit 100 and the first external communication channel are detected depending on a state detection result, the first control module 210 may transfer control right for the dual winding steering motor unit 300 to the second control module 220.

The first control module 210 and the second control module 220 may exchange information through the internal communication channel, may determine whether the internal communication channel has failed, and if the internal communication channel has failed, may exchange information through the external communication channel.

In the control signal output step S530, the first control module 210 may output a current amount smaller than a current amount in a normal state to the dual winding steering motor unit 300 as the control signal, or the second control module 220 may output a current amount smaller than a current amount in a normal state to the dual winding steering motor unit 300 as the control signal.

That is to say, as a control signal is generated based on a torque estimation value, the precision of the torque estimation value is not higher than the measurement value of the torque detection sensor unit 100. Therefore, in this consideration, the controller 200 may output the control signal to the dual winding steering motor unit 300 so that the dual winding steering motor unit 300 is controlled with a current amount smaller than the current amount in the normal state.

The smaller current amount may be controlled to a current amount corresponding to 40% to 60% of the current amount in the normal state.

For example, if the failures of the first torque sensor 110 and the second torque sensor 120 are detected, the first control module 210 may control the first winding motor 310 with a current amount of 50% smaller than the current amount in the normal state, based on a torque estimation value.

If the failures of the first torque sensor 110, the second torque sensor 120 and the first external communication channel are detected, the second control module 220 may control the second winding motor 320 with a current amount of 50% smaller than the current amount in the normal state, based on a torque estimation value.

As is apparent from the above description, according to the embodiments of the present disclosure, even if a failure or a malfunction occurs in the torque detection sensor unit 100, the controller 200 may generate a control signal by calculating a torque estimation value based on a vehicle speed, a steering angle, a yaw rate value and a lateral acceleration (lateral G) value and may control the dual winding steering motor unit 300 using the control signal, whereby it is possible to perform normal steering control for a predetermined time.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering control apparatus comprising:
a torque detection sensor unit including a first torque sensor and a second torque sensor which detect relative rotational displacements of a steering input shaft and a steering output shaft according to twist of a torsion bar disposed between the steering input shaft and the steering output shaft;
a controller including a first control module which is connected to the first torque sensor and a second control module which is connected to the second torque sensor; and
a dual winding steering motor unit including a first winding motor which is connected to the first control module and a second winding motor which is connected to the second control module,
wherein at least one of the first control module and the second control module detects a failed state by checking a detection signal of each of the first torque sensor and the second torque sensor, calculates a torque estimation value using information of a vehicle speed sensor, a steering angle sensor, a yaw rate sensor and a lateral acceleration sensor depending on states of the torque detection sensor unit and an external communication channel, and controls the dual winding steering motor unit by generating a control signal based on the torque estimation value.

2. The steering control apparatus of claim 1, wherein at least one of the first control module and the second control module comprises:
a detector detecting a failed state of each of the first torque sensor and the second torque sensor by checking a detection signal of each of the first torque sensor and the second torque sensor;
a calculator selecting an external communication channel of a normal state according to a failed state detection result of the detector, and calculating a torque estimation value using information of the vehicle speed sensor, the steering angle sensor, the yaw rate sensor and the lateral acceleration sensor; and
an outputter generating a control signal based on the torque estimation value of the calculator, and outputting the control signal to the dual winding steering motor unit.

3. The steering control apparatus of claim 1, wherein the controller controls the dual winding steering motor unit with a current amount smaller than a current amount in a normal state.

4. The steering control apparatus of claim 3, wherein the smaller current amount is 40% to 60% of the current amount in the normal state.

5. The steering control apparatus of claim 1, wherein the external communication channel includes a first external communication channel and a second external communication channel which are connected to external nodes and a gateway for transmitting and receiving data of the first external communication channel and the second external communication channel.

6. The steering control apparatus of claim 5, wherein the first control module and the second control module exchange information through an internal communication channel, the first control module exchanges information with the vehicle speed sensor, the steering angle sensor, the yaw rate sensor and the lateral acceleration sensor through the first external communication channel, and the second control module exchanges information with the vehicle speed sensor, the steering angle sensor, the yaw rate sensor and the lateral acceleration sensor through the second external communication channel.

7. The steering control apparatus of claim 6, wherein the first control module or the second control module determines whether the internal communication channel has failed, and if the internal communication channel has failed, exchanges information through the external communication channel.

8. The steering control apparatus of claim 6, wherein in the case where control priority of the first control module is higher than control priority of the second control module, if the first control module detects a failure of the first torque sensor, the first control module transfers control right for the dual winding steering motor unit to the second control module, and the second control module controls the dual winding steering motor unit when the control right is transferred.

9. The steering control apparatus of claim 6, wherein in the case where control priority of the second control module is lower than control priority of the first control module, if the second control module detects failures of the first torque sensor and the second torque sensor, the second control module transfers control right for the dual winding steering motor unit to the first control module, and the first control module calculates a torque estimation value by receiving information of the vehicle speed sensor, the steering angle sensor, the yaw rate sensor and the lateral acceleration sensor through the first external communication channel when the control right is transferred and controls the dual winding steering motor unit by generating a control signal based on the torque estimation value.

10. The steering control apparatus of claim 6, wherein if the first control module detects failures of the first torque sensor, the second torque sensor and the first external communication channel, the first control module transfers control right for the dual winding steering motor unit to the second control module, and the second control module calculates a torque estimation value by receiving information of the vehicle speed sensor, the steering angle sensor, the yaw rate sensor and the lateral acceleration sensor through the second external communication channel when the control right is transferred and controls the dual winding steering motor unit by generating a control signal based on the torque estimation value.

11. The steering control apparatus of claim 6, wherein in the case where control priority of the first control module is higher than control priority of the second control module, if the first control module determines, according to a result of comparing a torque value of the first torque sensor and a torque value of the second torque sensor through internal communication, that the torque value of the first torque sensor and the torque value of the second torque sensor are different from each other, the first control module calculates a torque estimation value by receiving information of the vehicle speed sensor, the steering angle sensor, the yaw rate sensor and the lateral acceleration sensor through the first external communication channel and controls the dual winding steering motor unit by generating a control signal based on the torque estimation value.

12. The steering control apparatus of claim 11, wherein in the case where control priority of the second control module is lower than control priority of the first control module, if the first control module determines, according to a result of comparing a torque value of the first torque sensor and a torque value of the second torque sensor through internal communication, that the torque value of the first torque sensor and the torque value of the second torque sensor are different from each other and detects a failure of the first external communication channel, the first control module transfers control right for the dual winding steering motor unit to the second control module, and the second control module calculates a torque estimation value by receiving information of the vehicle speed sensor, the steering angle sensor, the yaw rate sensor and the lateral acceleration sensor through the second external communication channel and controls the dual winding steering motor unit by generating a control signal based on the torque estimation value.

13. A steering control method comprising:
state detection step in which a first control module or a second control module detects failed states of a torque detection sensor unit and a communication channel;
torque estimation value calculation step in which, depending on a state detection result, the first control module or the second control module calculates a torque estimation value using information of a vehicle speed sensor, a steering angle sensor, a yaw rate sensor and a lateral acceleration sensor through an external communication channel; and
control signal output step in which the first control module or the second control module generates a control signal based on the torque estimation value and outputs the control signal to a dual winding steering motor unit.

14. The steering control method of claim 13, wherein
in the torque estimation value calculation step, if a failure of the torque detection sensor unit is detected depending on a state detection result, the first control module calculates a torque estimation value using information of the vehicle speed sensor, the steering angle sensor, the yaw rate sensor and the lateral acceleration sensor through a first external communication channel, and
in the control signal output step, the first control module generates a control signal based on the torque estimation value and outputs the control signal to the dual winding steering motor unit.

15. The steering control method of claim 14, wherein in the control signal output step, the first control module outputs a current amount smaller than a current amount in a normal state to the dual winding steering motor unit as a control signal.

16. The steering control method of claim 13, wherein
in the torque estimation value calculation step, if failures of the torque detection sensor unit and the first external communication channel are detected depending on a state detection result, the second control module calculates a torque estimation value using information of the vehicle speed sensor, the steering angle sensor, the yaw rate sensor and the lateral acceleration sensor through a second external communication channel, and
in the control signal output step, the second control module generates a control signal based on the torque estimation value and outputs the control signal to the dual winding steering motor unit.

17. The steering control method of claim 16, wherein in the control signal output step, the second control module outputs a current amount smaller than a current amount in a normal state to the dual winding steering motor unit as a control signal.

18. The steering control method of claim 17, wherein the smaller current amount is 40% to 60% of the current amount in the normal state.

19. The steering control method of claim 13, wherein in the torque estimation value calculation step, if failures of the torque detection sensor unit and the first external communication channel are detected depending on a state detection result, the first control module transfers control right for the dual winding steering motor unit to the second control module.

20. The steering control method of claim 13, wherein the first control module and the second control module exchange information through an internal communication channel, determine whether the internal communication channel has failed, and if the internal communication channel has failed, exchange information through the external communication channel.

* * * * *